United States Patent [19]

Ono

[11] 4,081,069
[45] Mar. 28, 1978

[54] FEEDING APPARATUS FOR CAPS MADE OF MAGNETIC SUBSTANCE
[75] Inventor: Hiroshi Ono, Kanazawa, Japan
[73] Assignee: Shibuya-Kogya Company, Ltd., Kanazawa, Japan
[21] Appl. No.: 313,600
[22] Filed: Dec. 8, 1972
[30] Foreign Application Priority Data
  Mar. 13, 1972  Japan .................. 47-25382
[51] Int. Cl.² ............................................ B65G 47/24
[52] U.S. Cl. ............................................ 198/384; 198/443
[58] Field of Search ........ 198/41, 29, 33 AA, 33 AB, 198/165, 31 R, 31 AA, 31 AB, 267–271, 276, 282, 283, 287, 288; 221/159, 160, 161; 222/290

[56] References Cited
U.S. PATENT DOCUMENTS

| 2,873,843 | 2/1959 | Wilson | 198/41 |
| 3,067,852 | 12/1962 | Barr | 198/41 |
| 3,153,471 | 10/1964 | Arnett | 198/31 AA |

Primary Examiner—Evon C. Blunk
Assistant Examiner—Joseph E. Valenza
Attorney, Agent, or Firm—Blanchard, Flynn, Thiel, Boutell & Tanis

[57] ABSTRACT

A feeding apparatus for caps which are made of magnetic substance to feed the caps of bottles to a cap placing apparatus one by one in good order in a continuous manner, in which said feeding apparatus comprises: a magnetic first conveyor belt to attract and transfer the caps from a hopper; a baffle to remove overlapping caps on said first conveyor belt; a second conveyor belt to select out the caps which are in the wrong position; a guide passage to feed the caps one by one to said cap placing apparatus; a set of an inclined guide fence and a swingable fence to define a guiding section; an outlet to discharge excess caps; and a swinging means to swing said swingable fence.

2 Claims, 8 Drawing Figures

FEEDING APPARATUS FOR CAPS MADE OF MAGNETIC SUBSTANCE

BACKGROUND OF THE INVENTION a. Field of the Invention

This invention relates to a feeding apparatus for crown caps, screw caps and the like, hereinafter referred to as "caps", which are made of magnetic substance. More particularly, a invention relates to the feeding apparatus for such caps of bottles and the like, in which the caps held disorderly in the hopper of the apparatus can be fed one by one in good order in a continuous manner to a cap receiving device of a cap placing apparatus such as a crowner or capper.

b. Description of the Prior Art

In the cap feeding apparatuses of the prior art, as the selecting means for the positioning of the caps in order to feed them with the proper sides out into a chute which is connected to a cap placing apparatus, there have been proposed several kinds of apparatuses in which, for example, disorderly arranged caps from the hopper are dropped on a rotating disk and said caps are separated by centrifugal force due to the difference of the friction to the disk surface between the caps in right positions and those in wrong positions, thereby the caps with a certain positioning are led to the chute. Further, in such conventional apparatus, the operator of the apparatus must usually remove the stagnated caps from the guide passage in order to prevent the accumulation of the caps at the guide passage which is connected to the cap placing apparatus. The conventional cap feeding apparatus produces loud noise. In addition to that, the hopper which holds the caps must be placed on the top portion of the apparatus and descending passages for caps must be generally employed. Therefore, the arrangement and installation of the apparatus are somewhat restricted. Further, the function of such feeding apparatus is not always sufficiently reliable in its operation. Still further, the work for removing the accumulated caps in the cap guide passage reduces the workability very much as well as it is troublesome for the operators.

SUMMARY OF THE INVENTION

In view of the above-mentioned disadvantages caused in the conventional apparatus, the principal object of the present invention is to provide an improved feeding apparatus for caps which are made of magnetic substance, in which the caps can be fed one by one continuously and constantly in good order to the cap receiving device of the cap placing apparatus, by the employment of a conveyor belt having magnetism.

A further object of the present invention is to provide an improved cap feeding apparatus in which the caps are received from the hopper placed in a lower position, and said caps are magnetically attracted by said magnetic conveyor belt and transferred effectively to a certain passage in the desired direction without producing any noises.

A still further object of the present invention is to provide an improved cap feeding apparatus in which a pair of conveyor belts are moved in parallel a small distance apart, and caps are attracted on the surfaces of said conveyor bels with their back sides out to perform the selective action of separating the differently arranged caps, and further either of such conveyor belts can be used as the transferring and feeding conveyor belt.

A still further object of the present invention is to provide an improved cap feeding apparatus in which a baffle is provided to release the overlapped caps on said conveyor belt, thereby the reliability of the performance of the above-mentioned selection mechanism by the pair of conveyor belts can be made sure to provide the correct operation of the feeding apparatus.

A still further object of the present invention is to provide an improved cap feeding apparatus in which the inlet portion of the guide passage which is positioned near the receiving device of the cap placing apparatus is provided with an intermittently swinging mechanism to sweep away the accumulated caps in said portion, thereby the caps can be moved smoothly and automatically without the assistance of the operator.

A still further object of the present invention is to provide an improved cap feeding apparatus in which a tapered cap guiding section being provided with an inclined guide fence and a swingable fence, is formed on the upstream portion of said guide passage, where the downstream half of said inclined guide fence is made movable and the top portion of said swingable fence is made of a spring-operated arc-shaped plate, thereby the prevention of the accumulation of the caps in the guiding section can be smoothly and effectively accomplished to provide reliable operation of the apparatus.

Pursuant to the above-mentioned objects, the present invention proposes a feeding apparatus for caps made of magnetic substance with comprises a first conveyor belt having magnetism to attract and transfer the caps from a hopper, a baffle to release overlapping of the caps on said conveyor belt, a second conveyor belt to select out the caps in wrong position, a guide passage to deliver the caps one by one to a cap placing apparatus, a set of an inclined guide fence and a swingable fence to define a guiding section, an outlet to discharge excess caps, and a swinging means to swing said swingable fence.

BRIEF DESCRIPTION OF THE DRAWINGS

These and other features of the invention will be more fully understood by referring to the following detailed description presented solely for purpose of illustration and to the accompanying drawings in which.

DESCRIPTION OF THE PREFERRED EMBODIMENTS

Figure 1:
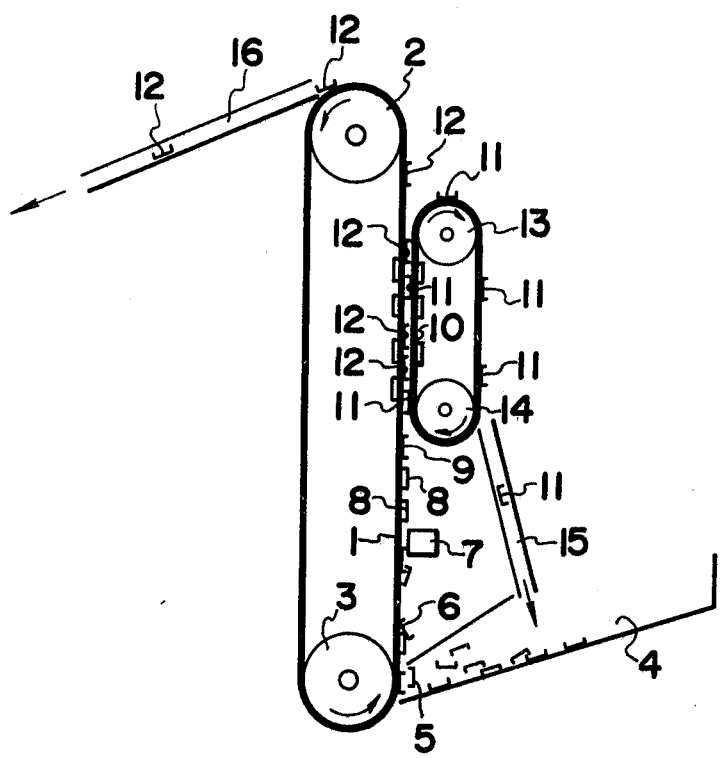
FIG. 1 is a vertical schematic illustration of an embodiment of the cap feeding apparatus of the invention.

Now referring to the drawings, especially to FIG. 1, the numeral 1 indicates a conveyor belt which is imparted with magnetism by, for example, a plurality of covered magnets, and is moved by a pair of pulleys 2 and 3 in the direction of the arrows. The lower end portion of said conveyor belt 1 is positioned close to an opening of a hopper 4 in which a large number of caps made of magnetic substance are contained in random order. When the hopper 4 is vibrated by a vibrator (not shown), the caps 5 in the hopper 4 contact with the conveyor belt 1 through the opening and are attracted by the magnetic force of the conveyor belt 1, thereby the caps are moved upwards on the surface of the conveyor belt 1. In this case, as the caps 5 are disorderly in the hopper 4, the caps are attracted on the conveyor belt 1 in no special order, so that some of the caps have their front sides out and other have their back sides out, and some of them overlap with each other as shown by the numeral 6. The numeral 7 is a baffle to release said overlapped caps 6 on the conveyor belt 1 which will be explained in detail in the following.

The conveyor belt 1 which attracts and carries the caps 8 of front side out and caps 9 of back side out, without these being overlapped caps due to the action of baffle 7, is then moved closely and in parallel with the second conveyor 10 which is also imparted with magnetism. Of course in this case, the distance between said first conveyor belt 1 and said second conveyor belt 10 must be somewhat larger than the height of each cap 8 or 9. By selecting the proper distance between the conveyor belts 1 and 10 and the proper intensities of the magnetism of the conveyor belts 1 and 10, the caps 8 which are fitted to the first conveyor belt 1 in front side out are attracted to the second conveyor 10 in the state of back side out as indicated by the numeral 11. Thus the caps 11 being attracted to the second conveyor belt 10 in back side out, are carried thereon by the rotations of the pulleys 13 and 14, and are returned again into the hopper 4 through the chute 15. The caps 9 which are attached in back side out on the first conveyor belt 1 are not transferred to the second conveyor belt 10 because the magnetic force of the first conveyor belt 1 attracts more strongly the caps 9 as compared with the magnetic force of the second conveyor belt 10. The caps remaining on the first conveyor belt which are now indicated by the numeral 12, are then carried as they are by the first conveyor belt 1 and fed to the cap placing apparatus or a capper (not shown) through the chute 16 or to the below-mentioned arranging means (in FIGS. 6 and 7).

The caps 11 which are carried on the second conveyor belt 10 can be fed also to said cap placing apparatus or another cap placing apparatus or capper in place of the above-mentioned returning to the hopper 4 through the chute 15. In such case, the selecting capacity of the feeding apparatus can be doubled. For example, in the former case, one cap placing apparatus is fed with the caps from two sources, therefore the apparatus must be controlled such that the caps are fed one by one by turns or when one source becomes free of caps, the other source can be used.

In order to impart magnetism to the first and the second conveyor belts 1 and 10, a large number of magnets are buried in the conveyor belts, or conventional magnetic belts on the market can be used. A similar effect can be obtained by providing magnetic plates close to the back side of said conveyor belts 1 and 10. But in this case, the pulleys 2 and 13 must be made of magnetic substance.

Figure 2:
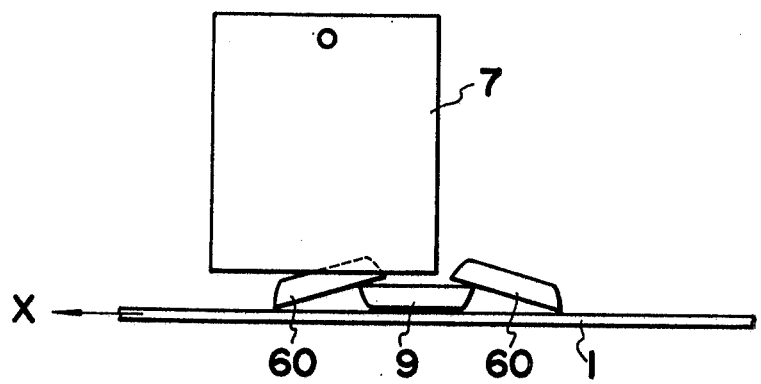
FIG. 2 is an enlarged side view of a baffle provided in the transferring passage of the apparatus as shown in FIG. 1.
Figure 3:
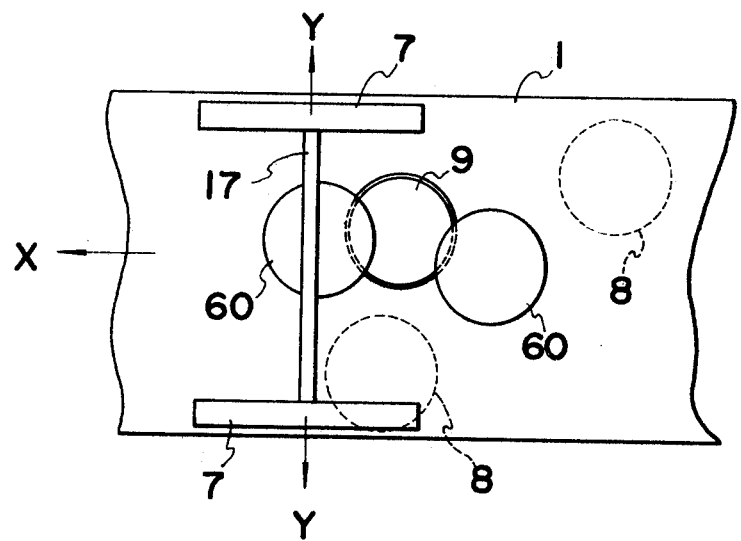
FIG. 3 is an enlarged plan view of said baffle as shown in FIG. 2.

FIGS. 2 and 3 illustrate the details of the baffle 7, which comprises two plates made of elastic material such as rubber. The distance between the lowermost ends of said plates 7 and the surface of the conveyor belt 1 is larger than the height of each cap while it is smaller than twice the height of the cap. Said plates are connected integrally by a connecting rod 17 and are reciprocated in the directions of the arrows Y which are at a right angle to the direction of the movement of the conveyor belt 1, i.e. the arrow X, by means of an appropriate reciprocating mechanism (not shown). During the reciprocation of the baffle 7, if the conveyor belt 1 carries a cap 9 of back side out which is overlapped with other caps 60 as shown in FIG. 2, the caps 60 contact with at least one end portion of said two plates and are moved aside. Thereby the overlapped caps 60 are changed into the caps 8 as shown by the dash lines in FIG. 3. Thus as shown in FIG. 1, all overlappings of the caps on the conveyor belt 1 are released by the baffle 7 in the condition of the caps 8 in front side out or the caps 9 in back side out, and they are then moved to the position of the second conveyor belt 10.

Figure 4:
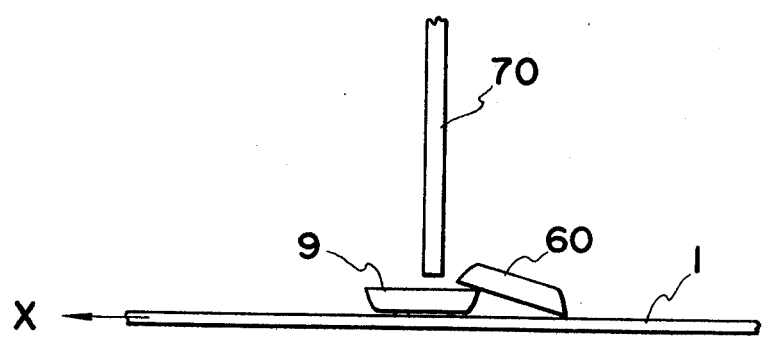
FIGS. 4 and 5 are a side view and a plan view, respectively, showing another embodiment of the baffle different from that shown in FIGS. 2 and 3.
Figure 5:
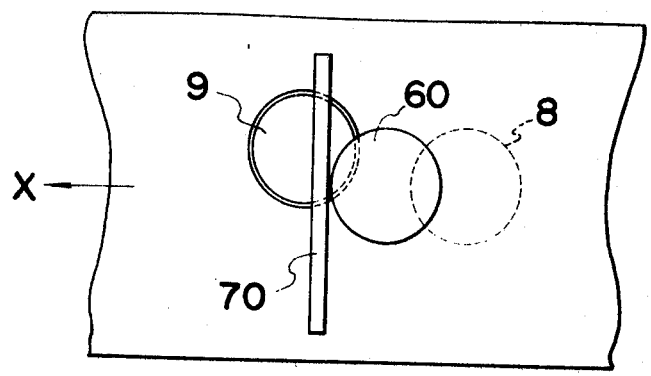

FIGS. 4 and 5 show another baffle 70 which has a simpler construction as compared with the above-mentioned baffle 7. The baffle 70 comprises an elastic plate and the distance between the lowermost end of said plate and the surface of the conveyor belt 1 is the same as the aforementioned distance between the lowermost ends of the two baffle plates 7 and the surface of the conveyor belt 1. This baffle plate 70 is fixed at its position by a proper means (not shown), while if there are overlapped caps 9 and 60 on the conveyor belt 1 moving in the direction of the arrow X as shown in FIG. 4, the lowermost end of the baffle 70 hits against the cap 60, thereby the cap 60 is moved backward and it becomes the state of the cap 8 as shown by the dash line in FIG. 5.

In order to obtain the complete effect of the baffle, both baffles 7 and 70 may be used together, for example, the baffle 70 is used for the first place and then the baffle 7 is used on the downstream portion of the conveyor belt 1. Of course, the above-explained baffles 7 and 70 are only exemplar embodiments, and any device which gives the same effect may be used in place of the above baffles.

Figure 6:
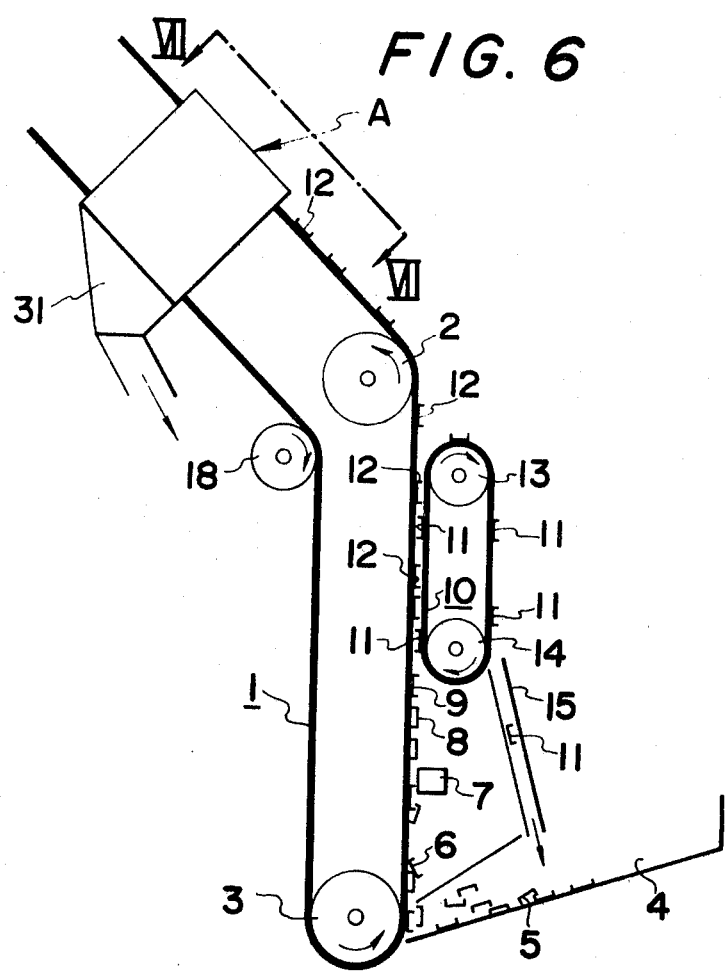
FIG. 6 is a vertical schematic illustration of another embodiment of the cap feeding apparatus in which a cap arranging means is provided on the downstream side of the conveyor belt to guide properly the caps to the cap placing apparatus.
Figure 7:
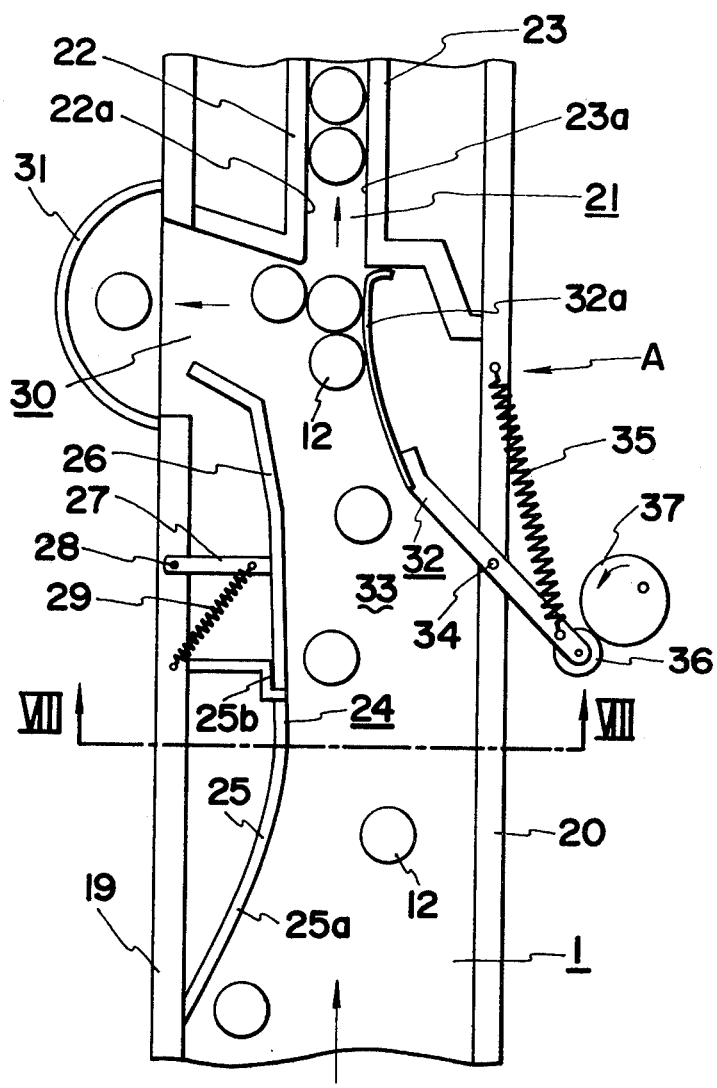
FIG. 7 is an enlarged plan view taken along the line VII—VII in FIG. 6.
Figure 8:
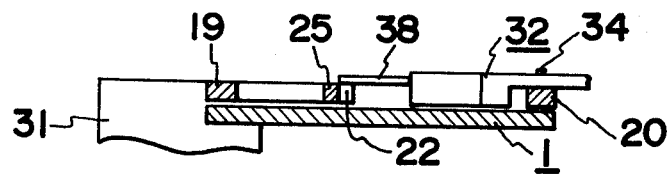
FIG. 8 is a sectional view taken along the line VIII—VIII in FIG. 7.

FIGS. 6, 7 and 8 illustrate another embodiment of the present invention, in which an arranging means A is provided to the guide passage of the caps to the cap receiving device in the downstream portion of the feeding apparatus. As shown in FIG. 6, the conveyor belt 1 is further elongated by providing it with another pulley 18 to convert the direction of the conveyor belt 1, and said arranging means A is installed on the elongated portion of the conveyor belt 1. The detailed structure of the arranging means A is shown in FIGS. 7 and 8. That is, in said figures, the numerals 19 and 20 are structural frames which are disposed on the both sides of the conveyor belt 1 leaving a proper space apart. In the downstream portion of the conveyor belt 1, the structural frames 19 and 20 are provided with guide fences 22 and 23, and the guide faces 22a and 23a of said fences define a guide passage 21 on the center line of the conveyor belt 1, the width of which passage 21 allows a cap to pass through. The upstream portion of said structural frame 19 is provided with an inclined guide fence 24, which comprises a stationary fence having an inclined face 25a in the upstream half and a movable fence 26 in the downstream half. The top of the attachment rod 27 of said movable fence 26 is pivoted to the structural frame 19 by a pin 28 and is further provided with a coil spring 29 between the frame 19, thereby the one end portion of the movable fence 26 is pressed against the shoulder 25b of the stationary fence 25. Between the top of said movable fence 26 and said guide fence 22, an outlet 30 is opened to discharge the excess caps to the side portion. The numeral 31 is a return hopper to receive the caps from said outlet 30 and to transfer the caps to the hopper 4 in FIG. 6.

The swingable fence 32 defines a tapered cap guide section 33 with said inclined guide fence 24, in which the caps 12 are passed to said guide passage 21. Said swingable fence 32 is attached to the frame 20 by a pin 34, and a coil spring 35 is provided between the projected portion of the swingable fence 32 and the downstream portion of said frame 20, further the top of said projected portion is provided with a roller 36 which is engaged with a rotating cam 37 on the side of the frame 20. Accordingly, when the roller 36 is engaged with the shorter diameter portion of said cam 37, the arc-shaped spring plate 32a on the top of said swingable fence 32 is swung to the outlet 30. While, in FIG. 8, the numeral 38 indicates a transparent cover plate which covers said guide passage 21.

As explained in the above with regard to FIG. 6, the caps 12 which are attached here and there on the surface of the conveyor belt 1 with back side out, are transferred into this section. In the first place, the caps 12 near the frame 19 are guided by the inclined face 25a of the stationary fence 25 to the guide section 33, and the caps 12 near the frame 20 are guided along the swingable fence 32 to the guide section 33, then the caps are introduced one by one into the guide passage 21, thereby the caps 12 are fed in good order to the cap placing apparatus. However, as shown in FIG. 6, the intervals of the caps 12 attached on the conveyor belt 1 are irregular and they often accumulate and become clogged in the guide section 33. Therefore, in order to pass the caps 12 into the guide passage 21 in good condition with a desired speed, the rotating cam 37 is driven by a proper driving means (not shown) to swing the swingable fence 32 around the pin 34. Thereby the spring plate 32a at the top portion of said fence 32 is moved toward the outlet 30, and the accumulated caps 12 in the inlet portion of the guide passage 21 are swept away through the outlet 30 into the hopper 31, then the caps 12 are further moved into the lower hopper 4 in FIG. 6. On this occasion, the movable fence 26 is pushed by the caps 12 and turned counterclockwise around the pin 28 against the force of the spring 29. Thus the outlet 30 is enlarged and the discharging action of the swingable fence 32 can be carried out smoothly. After this discharging operation by the swingable fence 32, said fence 32 and the movable fence 26 return to the original positions and the cap feeding is continued again. As the above-mentioned discharging of the accumulated caps are carried out intermittently according to the rotation speed of the rotating cam 37, there is no fear of the stagnation of caps in the inlet portion of the guide passage 21 and satisfactory feeding of the caps 12 can be carried out.

Still more, this arranging means A can be provided on the second conveyor belt in FIG. 6 in addition to that on the first conveyor belt 1, where thus arranged caps are fed to another cap placing apparatus without returning to the hopper 4. Further, the guide passage 21 in FIG. 7 is not restricted to one, for example, two guide passages may be provided according to the speed of the conveyor belt 1.

As disclosed in the above, the tapered cap guiding section is provided with the inclined guide fence and the swingable fence on both sides of the conveyor belt to guide the caps smoothly into the guide passage, therefore the caps which are irregularly attached on the conveyor belt do not clog with each other and are moved to the central portion of the conveyor belt, thereby the caps can be introduced into the guide passage effectively. Further, the outlet is formed on one side of the top portion of said inclined guide fence, and the swingable fence is swung intermittently against said outlet, therefore the caps which stagnate in the inlet portion of the guide passage can be discharged automatically through the outlet to the side portion, thus the feeding of the caps in good order to the cap placing apparatus can be carried out and the operator's work to remove the stagnated caps can be eliminated, which are very advantageous as compared with the conventional cap feeding apparatus.

It should be emphasized, however, that the specific embodiments described and shown herein are intended as merely illustrative and in no way restrictive of the invention.

What is claimed is:

1. An apparatus for feeding caps made of magnetically attractable substance from a hopper, which comprises:
    a first conveyor belt having magnetism which attracts said caps by the magnetic force thereof and receives and transfers said caps from said hopper onto said first conveyor belt;
    a baffle provided in operative relation to said first conveyor belt for displacing overlapping caps on said first conveyor belt so that a single layer of caps is formed on said first conveyor belt, with said caps being arranged so that either the front sides thereof or the back sides thereof face outwardly of said first conveyor belt;
    said baffle comprising two elastic plates disposed opposite one another on opposite sides of said first conveyor belt and connected by a connecting rod at the upper ends thereof, said connecting rod being reciprocated by a reciprocating means in a direction at right angles to the moving direction of said first conveyor belt; and
    a second conveyor belt having magnetism which is provided downstream of said baffle on said first conveyor belt, and is positioned close to said first conveyor belt to attract and transfer to said second conveyor belt only the caps disposed in front side out position on said first conveyor belt.

2. A feeding apparatus for caps as claimed in claim 1 in which a second baffle comprised of a single elastic plate is disposed transversely to said first conveyor belt downstream of said two plate baffle.

* * * * *